United States Patent [19]

Michaels et al.

[11] Patent Number: 5,002,745
[45] Date of Patent: Mar. 26, 1991

[54] METHOD OF SEPARATING AND RECOVERING PHOSPHORUS FROM PHOSPHORUS SLUDGE

[75] Inventors: Alan S. Michaels, Chestnut Hill, Mass.; Wayne H. Lee, Pocatello, Id.; Theodore F. Munday, Kendall Park, N.J.

[73] Assignee: FMC Corporation, Philadelphia, Pa.

[21] Appl. No.: 519,607

[22] Filed: May 7, 1990

[51] Int. Cl.$^5$ ............................................. C01B 25/04
[52] U.S. Cl. ..................................................... 423/322
[58] Field of Search .......................................... 423/322

[56] References Cited

U.S. PATENT DOCUMENTS

| | | | |
|---|---|---|---|
| 2,123,554 | 7/1938 | Klosky | 423/322 |
| 3,084,029 | 4/1963 | Barber et al. | 423/323 |
| 4,299,806 | 11/1981 | Kuck et al. | 423/322 |
| 4,595,492 | 6/1986 | Crea et al. | 209/2 |
| 4,777,029 | 10/1988 | Bugenov et al. | 423/322 |
| 4,780,296 | 10/1988 | Bugenov et al. | 423/333 |

FOREIGN PATENT DOCUMENTS

| | | | |
|---|---|---|---|
| 856976 | 8/1981 | U.S.S.R. | 423/322 |
| 891558 | 12/1981 | U.S.S.R. | 423/322 |

*Primary Examiner*—Wayne A. Langel
*Attorney, Agent, or Firm*—Frank Ianno; Robert L. Andersen

[57] ABSTRACT

A process is described for the separation and recovery of phosphorus from phosphorus-dirt mixtures by adding a quaternary ammonium compound to the mixture, while it is under an aqueous cover, agitating same, and separating a lower phosphorus phase from an upper dirt phase. The mixtures are treated prior to addition of the quaternary ammonium compound, where required, by lowering their dirt to phosphorus levels sufficiently low to permit them to be destabilized.

10 Claims, No Drawings

METHOD OF SEPARATING AND RECOVERING PHOSPHORUS FROM PHOSPHORUS SLUDGE

The present invention relates to a process for the separation and recovery of elemental phosphorus from phosphorus sludge and centrifuged phosphorus sludge.

In conventional operations, elemental phosphorus is produced by reacting phosphate ore with carbon at high temperature in an electric furnace. In the operation of such furnaces, the phosphate ore is typically agglomerated, calcined and fed into the furnace with coke to supply carbon, and silica to act as a fluxing agent. Graphite electrodes suspended within the furnace are in contact with the furnace feed and form a melt zone at the base of the electrodes where the phosphate ore is reduced to phosphorus.

In order to prepare the phosphate ore for use in the furnace, the ore is crushed, agglomerated by briquetting or pelletizing, and then is sintered or calcined into compact shapes to remove volatile elements from the ore. This procedure for preparing phosphate ore into briquettes suitable for use in a phosphorus furnace, is described in U.S. Pat. No. 3,760,048 issued on Sept. 18, 1973 in the names of James K. Sullivan et al.

The resulting phosphorus which is formed is vaporized, removed from the furnace, cleaned by electrostatic precipitators and condensed in one or more condensation steps by direct contact with water to form an aqueous slurry of phosphorus. The resulting phosphorus condensate separates when settled in collection sumps or tanks into three layers; a bottom layer of the desired elemental phosphorus, an intermediate layer of phosphorus sludge, and an upper layer of water containing dissolved phosphorus and fine particulate phosphorus. For purposes of this disclosure, the term "phosphorus sludge" means any phosphorus mixture that forms an intermediate layer between a bottom layer of elemental phosphorus and an upper water layer containing dissolved phosphorus.

One such type of phosphorus sludge layer is an emulsion of phosphorus and water with varying amounts of fine dirt slimes in the water phase, and some larger, gritty, abrasive material. Fine dirt slimes are also found within the phosphorus globules contained in the continuous water phase. The average composition of the sludge layer is about 50% by weight phosphorus, 40% by weight water and about 10% by weight dirt. Of course, the composition make up will vary greatly depending on the manufacturing technique, the ore employed and the effectiveness of some of the equipment employed in the manufacture of phosphorus such as the electric precipitators and the like. Such phosphorus sludge emulsions are believed to be stabilized mainly by very fine dirt slimes which separate the phosphorus globules in the water phase and by polymeric phosphorus sacs around the globules. The sacs form a membrane around the globules The outer surface is hydrophilic (attracted to water) and along with the slimes prevents globule coalescence.

Organic tars and dirt trapped within the condensed phosphorus globules are additional stabilizing agents. Such tars and dirt are carried from the electric furnace with the phosphorus containing gases through the electrostatic precipitators and contaminate the final condensed phosphorus product. One reason that is advanced for the formation of the polymeric phosphorus sacs that are formed about the phosphorus globules is air leakage into the furnace, precipitator and condenser system.

To recover the phosphorus from the phosphorus sludge, prior workers utilized such techniques as decantation (to permit as much phosphorus as possible to settle from the sludge layer), distillation of the sludge to vaporize the phosphorus, flocculating agents to settle the sludge such as animal glue, alum, anion-active surfactants, polyamphoteric electrolytes and the like and finally, centrifugation of the sludge to separate the phosphorus content of the sludge layer. An additional treatment is oxidation of the film by oxidizing agents, for example, chromic acid and the like. Of these, centrifugation appears to be cost effective for separating the greatest amount of phosphorus possible commensurate with the expense and time for carrying out such sludge treatment. This is described in U.S. Pat. No. 3,084,029 issued on Apr. 2, 1963 in the names of Barber et al.

In the process of centrifuging the phosphorus sludge to recover phosphorus, a heavy fraction of phosphorus and dirt, very low in water content, is separated from a light fraction, containing mostly water, slimes and some fine phosphorus globules. This light portion can be treated as set forth in U.S. Pat. No. 4,595,492 to recover some of the phosphorus values contained therein. The recovered heavy fraction (called "centrifuged product") is a black, concentrated sludge, containing little or no water, and where the continuous phase is molten phosphorus in which is found varying amounts of dirt, organic tars, slimes and the like which stabilize this dirt and phosphorus mixture. This centrifuged product normally is recycled to the furnace to vaporize the phosphorus values therein and thereby recover such phosphorus values.

While these processes are effective in recovering phosphorus values from the sludge, they do not solve the basic problem of effectively treating sludge and/or centrifuged product to separate the phosphorus from the dirt that causes the phosphorus to remain as a dirt-stabilized emulsion instead of as a coalesced phosphorus phase, separate from the dirt and/or water phases.

It has now been found that phosphorus can be separated and recovered from phosphorus-dirt mixtures by adding to said mixture an effective amount of a quaternary ammonium compound having the formula:

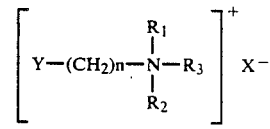

where $R_1$ and $R_2$ are each lower alkyl groups of $C_1$ to $C_5$,
where $R_3$ is $C_8$ to $C_{18}$ n-alkyl groups,
where n equals 0 to 3,
where Y is phenyl, alkylated phenyl or a long-chain alkyl of $C_{12}$ to $C_{22}$, and
where X is halogen agitating the mixture, separating a lower phase of coalesced molten phosphorus having a reduced dirt content, an upper phase of dirt reduced in phosphorus content, and recovering the separated molten phosphorus, wherein said mixture prior to being mixed with said quaternary ammonium compound has an aqueous phase covering it and a sufficiently low ratio of dirt to phosphorus to permit the mixture to be destabilized. The quaternary ammonium salt is preferably employed in amounts of at least 200 ppm with the most preferred range being from about 200 ppm to about 2000 ppm.

In carrying out the present invention, it may be necessary to reduce the weight percent of dirt in the molten phosphorus-dirt mixture. If the mixture contains easily separable dirt, it is first treated to a separating stage such as filtration, centrifugation or decantation to remove as much of the easily separable dirt as possible from the remainder of the molten phosphorus-dirt mixture. The resulting molten phosphorus-dirt mixture is then placed in a container and covered with sufficient water to assure that none of the phosphorus will contact air and burn in any subsequent operations. The addition of water is necessary if the mixture contains little or no water, such as centrifuge product. If the mixture already contains substantive amounts of water, such as ordinary sludge, little or no water addition may be necessary.

The concentration of the dirt in this mixture is then reduced, for example, by adding clean phosphorus to the mixture. This has the effect of reducing the weight percent of dirt in the total phosphorus mixture, that is, the original phosphorus plus the added clean phosphorus. The amount of clean phosphorus added is sufficient to bring the weight percent of dirt in the phosphorus mixture to levels where the dirt can be destabilized by the quaternary ammonium salt that is to be added in a subsequent stage. It is impossible to give exact proportions of dirt to phosphorus because these will vary depending on the type of dirt and its stabilizing effectiveness on the phosphorus mixture.

After reducing the weight percent of dirt in the phosphorus-dirt mixture, a quaternary ammonium salt having the following structure is added

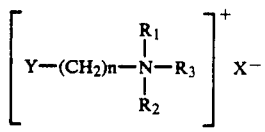

where $R_1$ and $R_2$ are each lower alkyl groups of $C_1$ to $C_5$,
where $R_3$ is $C_8$ to $C_{18}$ n-alkyl groups,
where n equals 0 to 3,
where Y is phenyl, alkylated phenyl or a long-chain alkyl of $C_{12}$ to $C_{22}$, and
where X is halogen The quaternary ammonium salt is normally added as a 1% to 5% aqueous solution and in effective amounts, normally at least about 200 ppm and preferably from about 200 ppm to about 2000 ppm. The resulting mixture is then agitated by mechanical stirring or other means to assure thorough mixing of the added quaternary ammonium salt with the aqueous and phosphorus ingredients. An inert gas blanket may be used over the mixture. In this and all of the stages, the phosphorus must be maintained sufficiently hot to keep it in a molten state, since otherwise the desired separations simply will not occur.

After the agitation has been completed, the mixture is allowed to stand and separate into a lower yellow molten phosphorus layer and an upper aqueous layer. In general, it has been found that the dirt forms as a layer directly above the phosphorus layer at the interface between the water and phosphorus layer while some light dirt rises to the surface of the aqueous layer. The separation has been found to be quite dramatic in that the phosphorus-dirt mixture, which is a black mass when treated, separates into a clean yellow phosphorus residue above which is found the black dirt which forms as a thin ring or layer on the surface of the coalesced phosphorus layer. The resulting molten yellow phosphorus which coalesces as a bottom layer can readily be separated and recovered by decantation from the dirt and aqueous layer above it.

The preferred quaternary ammonium salts which have been found effective are:

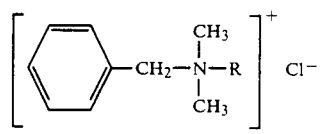

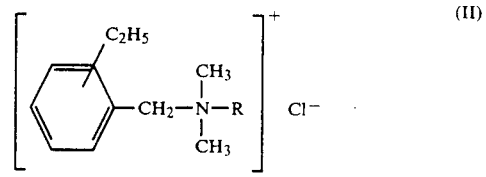

where R is $C_8$ to $C_{18}$

This class of compounds has the generic formula

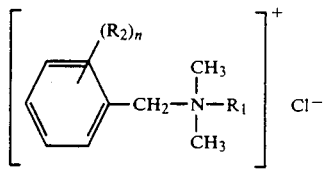

where $R_1$ is an alkyl group of $C_8$ to $C_{18}$,
where $R_2$ is a lower alkyl group of $C_1$ to $C_5$, and
where n is 0 to 1.

The amount of dirt in the phosphorus-dirt mixture can usually be determined by testing the mixture for toluene insolubles. In general, the toluene insolubles is a direct indication of the amount of dirt in the phosphorus-dirt mixture. In the present specification and examples, the term "weight percent or percent dirt" means the weight percent of toluene insolubles which have been found in the sample.

The manner in which the present class of quaternary ammonium salts operate to destabilize the phosphorus-dirt mixture is not clear. It is known, however, that if the dirt concentration in the phosphorus is too high, the quaternary ammonium compounds do not seem to be able to be effective in destabilizing the dirt-phosphorus mixture. For this reason, the weight percent of dirt in the phosphorus mixture must be reduced, when required, as set forth above, before employing the quaternary ammonium compound of the present invention. Of course, if the ratio of dirt + phosphorus in the mixture is already sufficiently low, the addition of clean phosphorus may not be necessary and the sample can be treated directly with the quaternary ammonium compound aforesaid. While the present invention employs the addition of clean phosphorus as a way of reducing the amount of dirt in the phosphorus mixture, it is understood that any other technique which will remove some of the dirt from the phosphorus is contemplated as part of the present invention.

Once the desired low weight percent of the dirt has been achieved in the phosphorus mixture, the action of the present quaternary ammonium compounds destabilizes the resulting mixture and separates it into phosphorus and dirt phases. How this destabilization is achieved is unknown. It is clearly not a simple surfactant phenomena since other compounds with known surfactant properties have been attempted and have not yielded the unexpected results obtained with these quaternary ammonium compounds. For example, the same technique was employed with the following compounds, all of which are known to have some surface-active properties, at concentrations of 50, 400 and 1000 ppm, without any success. These include Triton X-100, Aerosol TO, Pluronic F-68, 2,ethylhexylamine, sodium hexametaphosphate, sodium tripolyphosphate, sodium lignosulfate and sodium aluminum sulfate. These represent anionic, nonionic and cationic types of surface-active agents.

It is theorized that the quaternary ammonium compound must in some way react with the dirt and/or other stabilizing agent in the phosphorus mixture and thereby make it unavailable to stabilize the phosphorus-dirt emulsion. When this occurs, the phosphorus is then able to coalesce into a separate phase and the lighter dirt forms another layer above it, at the phosphorus-water interface.

The following examples are given to illustrate the invention, without intending to be limiting thereof. All percents are by weight unless otherwise specified.

EXAMPLE 1

A black phosphorus sludge containing 62.6% water, by weight, was recovered from the product handling system tanks. Analysis indicated (on a dry basis) 76.9% P, and 23.1% dirt solids, measured as material not soluble in toluene. One hundred (100) ml of this sludge was placed in a container under 125 ml DI water. One and one-half (1.5) ml of 1% benzalkonium chloride, trade name Zephiran ® chloride (alkyl dimethyl benzyl ammonium chloride, where the alkyl groups were mixtures of $C_{12}$, $C_{14}$, $C_{16}$ and other groups of $C_8$ to $C_{18}$) was added and the system mixed intensely for 15 seconds. After the mixing was stopped, a coalesced black phase separated to the bottom within a few seconds. An additional 1.5 ml of the benzalkonium chloride was added, and the system mixed for 15 more seconds. After the mixing was stopped, within 15 seconds, yellow coalesced phosphorus had collected at the bottom of the container. The black solids were separated to a puffy black material in the water layer above the yellow phosphorus. The total benzalkonium added amounts to about 250 parts per million based on the amount of sludge used.

EXAMPLE 2

Example 1 was repeated with a different sludge that contained 30.8% water by weight. This sludge analyzed 90.2% phosphorus and 9.8% dirt solids on a dry basis. Sixteen (16) ml of the 1% benzalkonium chloride trade name Zephiran ® chloride (alkyl dimethyl benzyl ammonium chloride, where the alkyl group was 50% $C_{14}$, 40% $C_{12}$ and 10% $C_{16}$) was added and mixed intensely for 10 seconds. After the mixing, yellow phosphorus was separated as in Example 1, again with the black solids collected into the water phase as a puffy black material.

EXAMPLE 3

A black phosphorus material was recovered from phosphorus sludge by passing through a centrifuge such as that reported in U.S. Pat. No. 3,084,029. Analysis indicated 77.5% P and 22.5% dirt solids on a dry basis. Twenty-five (25) ml of this material plus 50 ml of filtered yellow phosphorus was added to a container with 150 ml deionized water and 5 ml of 1% benzalkonium chloride as in Example 2, and mixed intensely for 10 seconds. After the mixing was stopped, about 75 ml of pale yellow phosphorus collected as a coalesced phase at the bottom of the container. The black solids were collected in a narrow band at the interface of the phosphorus and the water. Analysis of the yellow phosphorus product showed 99.7% phosphorus and 0.3% solids on a dry basis. The total benzalkonium chloride added amounts to about 1250 parts per million based on the centrifuge product alone, or about 550 parts per million based on the centrifuge product plus the added filtered phosphorus.

EXAMPLE 4

Example 3 was repeated with a similar centrifuged product as in Example 3, except that the quaternary ammonium compound added was 5 ml of a 3% solution of a mixture of 50% by weight of each of:
 (a) n-alkyl, dimethyl benzyl ammonium chloride where the n-alkyl was 60 weight percent $C_{14}$, 30 weight percent $C_{16}$, 5 weight percent $C_{12}$ and 5 weight percent $C_{18}$,
 (b) n-alkyl, dimethyl ethylbenzyl ammonium chloride where the n-alkyl group was 50 weight percent $C_{12}$, 30 weight percent $C_{14}$, 17 weight percent $C_{16}$ and 3 weight percent $C_{18}$.

Separation of yellow phosphorus as a coalesced bottom phase from an upper water and dirt phase also took place as in Example 3.

EXAMPLE 5

Example 3 was repeated in all respects except that the benzalkonium chloride was not added. The result was the formation of about 225 ml of black sludge material, and no separation of yellow phosphorus.

We claim:
1. Process of separating and recovering phosphorus-dirt mixture comprising adding to said mixture, at a temperature above the melting point of phosphorus, an effective amount of a quaternary ammonium compound having the formula:

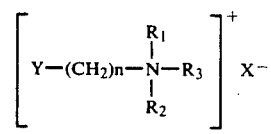

where $R_1$ and $R_2$ are each lower alkyl or $C_1$ to $C_5$,
where $R_3$ is $C_8$ to $C_{18}$ n-alkyl groups,
where n equals 0 to 3,
where Y is phenyl, an alkyl phenyl or a long-chain alkyl group of $C_{12}$ to $C_{15}$,
where X is halogen agitating the mixture, separating a lower phase of coalesced molten phosphorus reduced in dirt content, an upper phase of dirt reduced in phosphorus content, and recovering the separated molten phosphorus, wherein said mixture prior to being mixed with said quaternary ammonium compound has an aqueous phase covering it and a sufficiently low dirt to phosphorus ratio to permit it to be destabilized.

2. Process of claim 1 wherein the quaternary ammonium compound is employed in amounts of 200 to 2000 ppm.

3. Process of claim 1 wherein the dirt to phosphorus ratio is reduced by adding clean phosphorus to said mixture.

4. Process of claim 1 wherein said mixture has an aqueous phase covering it and is first treated by adding clean phosphorus thereto in amounts to lower the dirt to phosphorus ratio to permit the mixture to be destabilized.

5. Process of separating and recovering phosphorus from a phosphorus-dirt mixture comprising adding to said mixture, at a temperature above the melting point of phosphorus, an effective amount of a quaternary ammonium compound having the formula

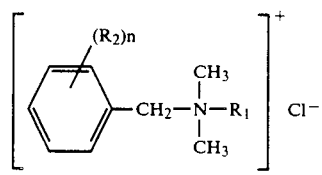

where $R_1$ is an alkyl group of $C_8$ to $C_{18}$,
where $R_2$ is a lower alkyl group of $C_1$ to $C_5$,
where n is 0 to 1
agitating the mixture, separating a lower phase of coalesced molten phosphorus reduced in dirt content an upper phase of dirt reduced in phosphorus content, and recovering the separated molten phosphorus, wherein said mixture prior to being mixed with said quaternary ammonium compound has an aqueous phase covering it and a sufficiently low dirt to phosphorus ratio to permit it to be destabilized.

6. Process of claim 5 wherein the value of $R_2$ is $C_2H_5$ and n is 1.

7. Process of claim 5 wherein the value of n is 0.

8. Process of claim 5 wherein the quaternary ammonium compound is employed in amounts of 200 to 2000 ppm.

9. Process of claim 5 wherein the dirt to phosphorus ratio is reduced by adding clean phosphorus to said mixture.

10. Process of claim 5 wherein said mixture has an aqueous phase covering it and is first treated by adding clean phosphorus thereto in amounts to lower the dirt to phosphorus ratio to permit the mixture to be destabilized.

* * * * *